United States Patent [19]
Kenmochi et al.

[11] Patent Number: 5,900,947
[45] Date of Patent: May 4, 1999

[54] COMMUNICATION APPARATUS PRINTS OR TRANSMITS RECEIVED DATA DEPENDING ON WHETHER A PREDETERMINED NUMBER IS INCLUDED IN A RECEIVED COMMAND OR NOT

[75] Inventors: Toshio Kenmochi, Yokohama; Hiroyuki Horii, Hiratsuka, both of Japan

[73] Assignee: Canon Kabushiki Kaisha, Tokyo, Japan

[21] Appl. No.: 08/725,243

[22] Filed: Oct. 4, 1996

Related U.S. Application Data

[63] Continuation of application No. 08/295,464, Aug. 25, 1994.

[30] Foreign Application Priority Data

Aug. 27, 1993 [JP] Japan .................................. 5-213006

[51] Int. Cl.⁶ .................................................... H04N 1/32
[52] U.S. Cl. ............................................ 358/442; 358/468
[58] Field of Search ..................................... 358/442, 468, 358/440, 434, 400, 407, 296, 444; 395/114; 379/100.01, 100.09; 375/222

[56] References Cited

U.S. PATENT DOCUMENTS

| | | | |
|---|---|---|---|
| 4,652,933 | 3/1987 | Koshiishi | 358/442 |
| 4,924,493 | 5/1990 | Dang et al. | 379/94 |
| 4,964,154 | 10/1990 | Shimotono | 379/100 |
| 5,021,892 | 6/1991 | Kita et al. | 358/468 |
| 5,224,154 | 6/1993 | Aldridge et al. | 379/93 |
| 5,274,547 | 12/1993 | Zoffel et al. | 364/408 |
| 5,408,520 | 4/1995 | Clark et al. | 379/93 |
| 5,428,671 | 6/1995 | Dykes et al. | 379/93 |
| 5,452,106 | 9/1995 | Perkins | 358/468 |
| 5,608,546 | 3/1997 | Nakamura et al. | 358/468 |
| 5,684,607 | 11/1997 | Matsumoto | 358/442 |

OTHER PUBLICATIONS

McConnell, Kenneth R.; Bodson, Dennis; Schaphorst, Richard, Fax: Digital Facsimile Technology & Applications, 1989, pp. 25–83, 197, 198.

Primary Examiner—Edward L. Coles
Assistant Examiner—Cheukfan Lee
Attorney, Agent, or Firm—Fitzpatrick, Cella, Harper & Scinto

[57] ABSTRACT

The present invention is intended to provide a communication apparatus with high versatility and multiple functions to which an optional color recording function can be added, and disclose the communication apparatus which has a recording means and is connected to a data terminal to transmit the data prepared or stored by the data terminal to a communication line according to a control commands from the data terminal whereby the image data is recorded by the recording means according to a specific command of the above control commands.

22 Claims, 18 Drawing Sheets

FIG. 2
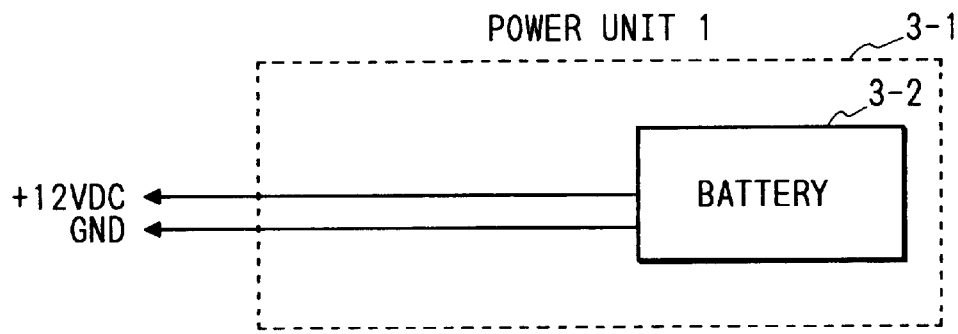
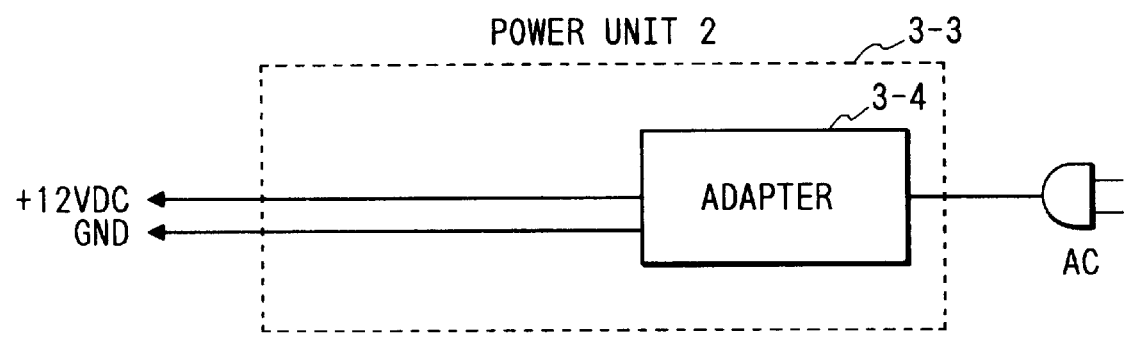
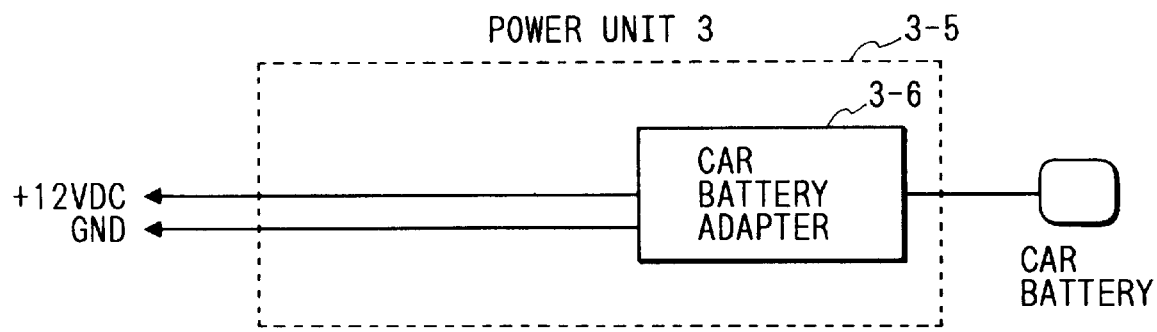

COMMUNICATION APPARATUS PRINTS OR TRANSMITS RECEIVED DATA DEPENDING ON WHETHER A PREDETERMINED NUMBER IS INCLUDED IN A RECEIVED COMMAND OR NOT

This application is a continuation of application Ser. No. 08/295,464 filed Aug. 25, 1994.

BACKGROUND OF THE INVENTION

1. Field of the Invention

The present invention relates to a communication apparatus which has an interface for data terminals.

2. Related Background Art

A reference example according to the related art is disadvantageous in that the control software for read and write operations of the communication apparatus is specific to the communication apparatus and lacks versatility.

If this type of communication apparatus is used as a printer or a scanner, specific control software of one communication apparatus is incorporated in the data terminals to carry out write and read operations.

In view of the above problem, for example, another application (U.S. Ser. No. 889,199, filed on May 28, 1992) has proposed a configuration in which a facsimile unit is controlled from a host computer.

In such proposed configuration, however, there is room for improvement since a dedicated command system such as firmware is required to control the facsimile unit from the host computer.

SUMMARY OF THE INVENTION

An object of the present invention made in view of the above points is intended to provide a communication apparatus which excels in versatility.

Another object of the present invention is to provide a communication apparatus capable of easily controlling the facsimile unit from a data processor.

A preferred embodiment of the present invention with the object as described above provides a communication apparatus which has recording means and is connected to data terminals and transmits the data prepared or recorded at the data terminals to the line according to general-purpose control commands from the data terminals and further records the data by recording means according to a specific command of the general-purpose control commands.

A further object of the present invention is to provide an apparatus capable of discriminating a kind of card to be mounted in the apparatus and carrying out a preferable control according to the result of such discrimination.

A further object of the present invention is to provide a communication apparatus capable of preferably carrying out color processing.

A further object of the present invention is to provide a communication apparatus capable of carrying out color processing with a simple construction.

Other objects and characteristics of the present invention will be obvious from the following description of the embodiments and drawings.

BRIEF DESCRIPTION OF THE DRAWINGS

FIG. 2 is a block diagram showing a power unit according to an embodiment of the present invention;

DESCRIPTION OF THE PREFERRED EMBODIMENTS

Preferred embodiments of the present invention are described below.

Figure 1:
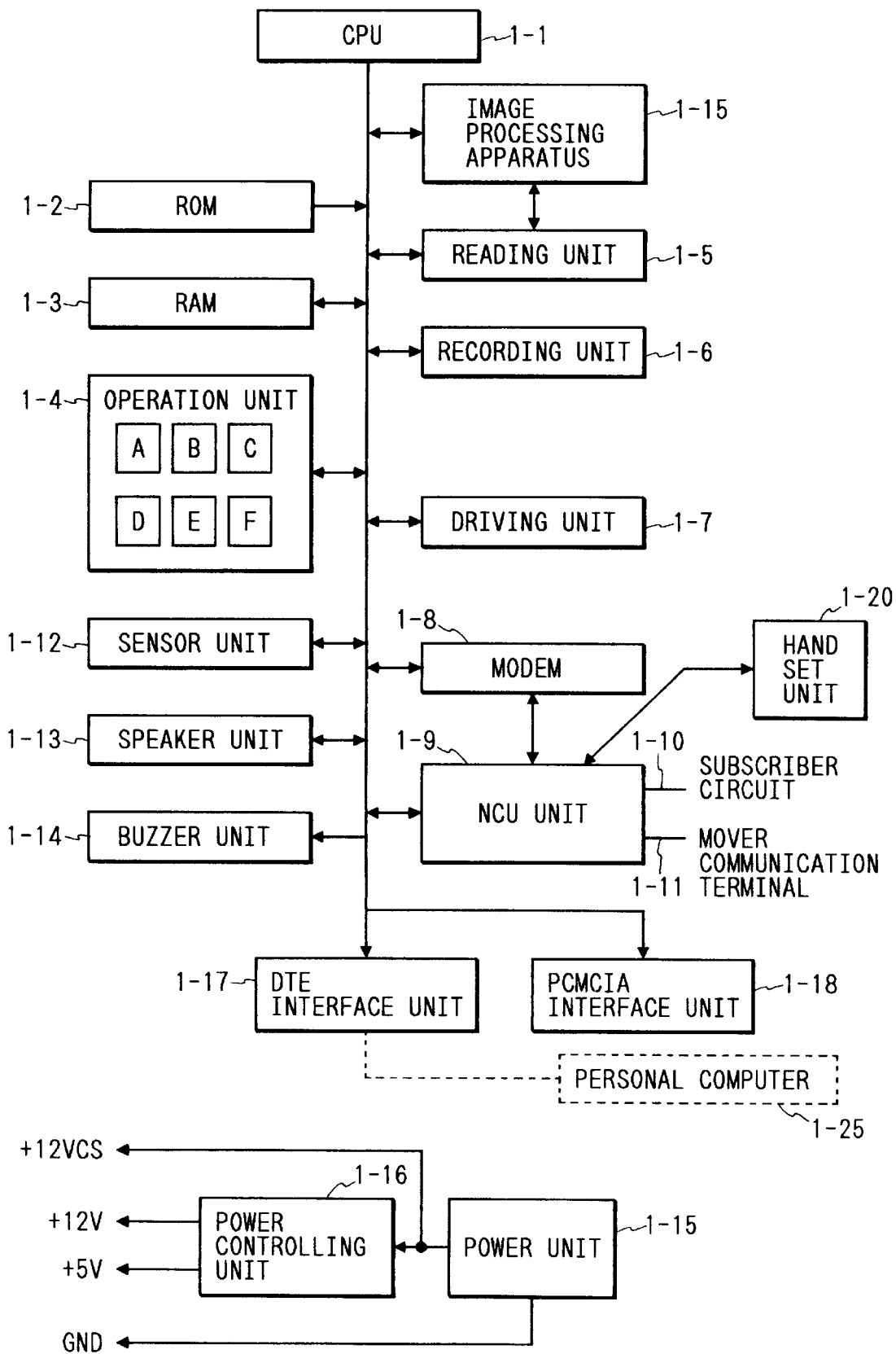
FIG. 1 is a block diagram showing a configuration of a main body of an image communication apparatus according to an embodiment of the present invention.

FIG. 1 shows a block configuration diagram of a main unit of the apparatus according to the present invention.

A CPU 1-1 carries out control of the whole facsimile unit, that is, a RAM 1-3, operation unit 1-4, a reading unit 1-5, a recording unit 1-6, a driving unit 1-7, a modem 1-8, an NCU unit 1-9, a sensor unit 1-12, and a buzzer unit 1-14, and transmits and receives commands to/from a card connected to a DTE (Data Terminal Equipment) and a PCMCIA (Personal Computer Memory Card Interface Associator) through a DTE interface 1-17 and a PCMCIA interface 1-18, according to a program stored in the ROM 1-2.

The following describes these units.

The RAM 1-3 stores binary-coded image data, which is read by a reading unit 1-5, or binary-coded image data to be recorded by a recording unit 1-6, and binary-coded data to be modulated by a modem 1-8 and outputted from a subscriber circuit 1-10 through an NCU unit 1-9. A RAM 1-3 is used to demodulate analog waveforms entered from the subscriber circuit 1-10 by the NCU unit 1-9 and the modem 1-8 and store binary-coded data.

The operation unit 1-4 comprises a start key A for transmission and reception, a mode key B for designating an operation mode such as FINE and STANDARD in transmitted images, a copy key C for copying operation, a mode key D by which an operator selects the operation mode according to a command from the DTE of the communication apparatus, a stop key E for stopping the operation and a scanner key F for operating as a scanner for a computer.

The CPU 1-1 detects these keys when they are held down and controls appropriate units in accordance with the conditions of these keys.

The reading unit 1-5 comprises a DMA controller, a CCD or direct-contact type image sensor (CS), a general-purpose IC, and a binary-encoding circuit, binary-encodes the data read by using the CCD or the CS based on the control of the CPU 1-1 and sends in sequence binary-coded data to the RAM 1-3. Read image data can be processed by an image processing apparatus 1-15 and the processed data can be transferred to the image memory.

The recording unit 1-6 comprises a DMA controller, a thermal head or a bubble jet printer unit for B4 and A4 sizes, a paper feed roller, and general-purpose integrated circuits, fetches the data stored in the RAM 1-3 according to the control of the CPU 1-1 and prints out the data as hard copies.

The driving unit 1-7 comprises a stepping motor for driving the paper feed roller for the reading unit 1-5 and the recording unit 1-6, gears for transmitting a driving force of the motor, and a driver circuit for controlling the motor.

The modem 1-8, which comprises G3, G2, G1 and old FM modems and clock generating circuits respectively connected to these modems, modulates transmission data stored in the RAM 1-3 and output it to the subscriber circuit 1-10 or a mobile communication equipment 1-11 through the NCU unit 1-9. In addition, the modem 1-8 introduces and demodulates analog signals from the subscriber circuit 1-10 or the mobile communication equipment 1-11 through the NCU 1 unit 1-9 and stores binary-coded data in the RAM 1-3.

The NCU unit 1-9, comprising a DC capturing circuit and a 2-line/4-line conversion circuit, connects the subscriber circuit 1-10 to the modem 1-8. Moreover, the NCU unit 1-9 connects the mobile communication apparatus 1-11 to the modem 1-8 with four lines. In addition, a handset 1-20 can be connected to the NCU unit 1-9.

The LINE 1-10 is a subscriber line to be connected to the NCU unit 1-9.

The mobile communication apparatus 1-11 is a line for mobile communication to be connected to the NCU unit 1-9.

The sensor 1-12 comprises a recording paper width sensor, a recording paper presence sensor, an original width sensor and an original presence sensor, and detects the condition of the original and recording paper according to the control by the CPU 1-1.

The DTE interface 1-17 is an interface part between the communication apparatus and the DTE (Data Terminal Equipment) and the RS-232C interface is used in this embodiment.

The PCMCIA interface unit 1-18 comprises interface circuits of PCMCIA cards. When the memory card is loaded, the CPU 1-1 communicates with the card through the interface circuit and determines from the information obtained from the card that the memory card has been loaded, then operates according to such determination.

When the FAX modem card is loaded, the CPU 1-1 communicates with the card through the interface circuit and determines according to the information obtained from the card that the FAX modem card has been loaded, then operates according to such determination.

The power unit 1-15 supplies power to the units. In this embodiment, any one of three types of configurations as shown in FIG. 2 is available and therefore DC power of +12 V is outputted by selecting one of these supplies.

The power unit 3-1 comprises a DC +12 V battery 3-2 and supplies a power of DC +12 V to the component units of the apparatus.

The power unit 3-3 comprises an AC adapter 3-4 which converts input AC power to a power of DC +12 V and supplies the power of DC +12 V to the component units of the apparatus.

The power unit 3-5 comprises a car battery adaptor 3-6 for converting a DC power from a car battery mounted on an automobile to a stable DC +12 V and supplies the DC +12 V to the component units of the apparatus.

The power control unit 1-16 comprises a series regulator, a switching regulator and a DC/DC converter and converts a DC +12 V supplied from the power unit 1-15 to a DC +5V and outputs both the above-described DC +12 V and 5 V.

The buzzer unit 1-14 comprises a buzzer and a buzzer drive unit and sounds for warning according to the control from the CPU.

FIGS. 3 to 6 respectively illustrate the transfer of commands and signals among the communication apparatus and the DTE or the facsimile unit (partner facsimile).

The following describes the outline of operation according to the present invention, referring to the drawings.

Figure 3:
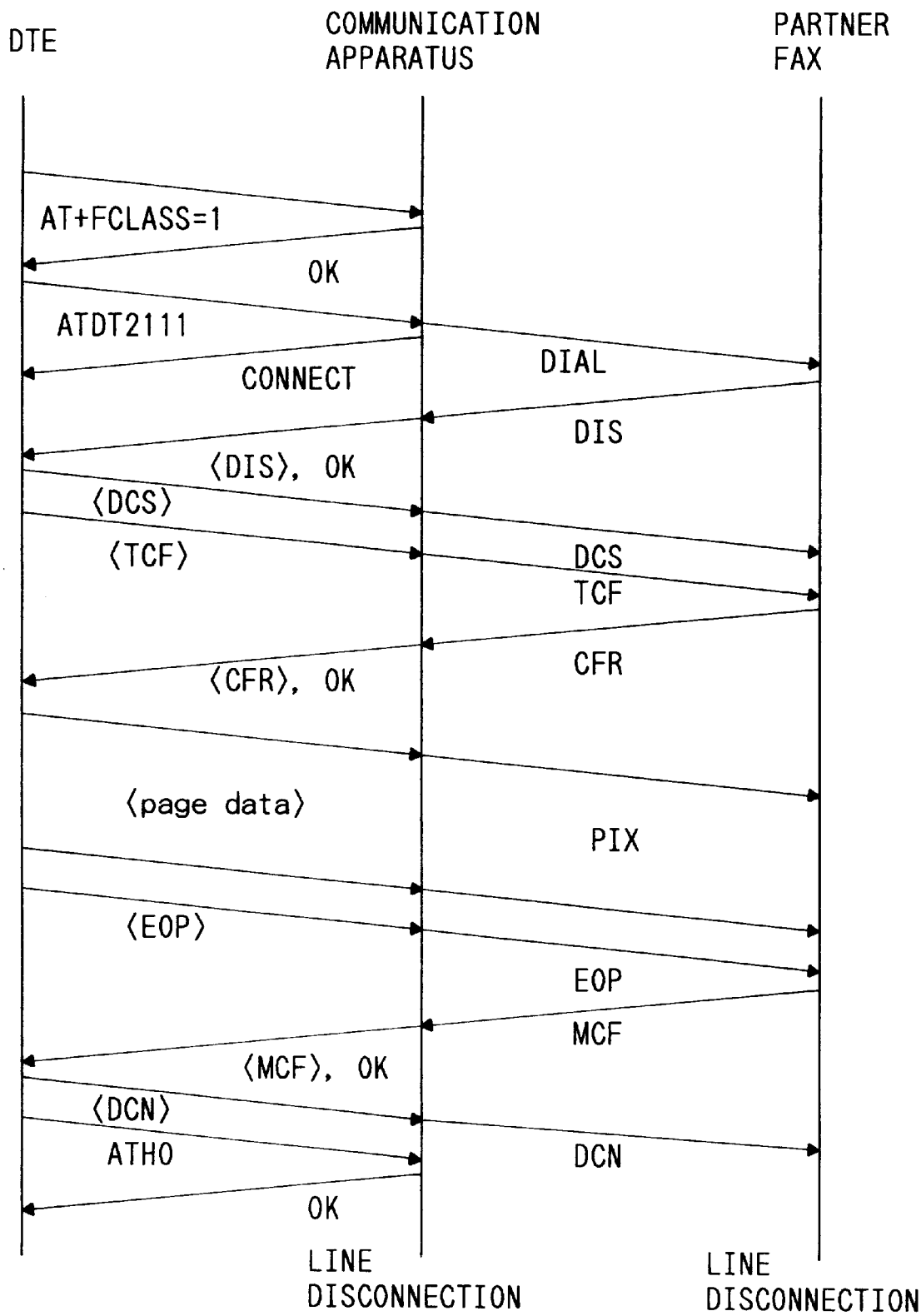
FIG. 3 is a timing chart showing operation of the present embodiment.
Figure 4:
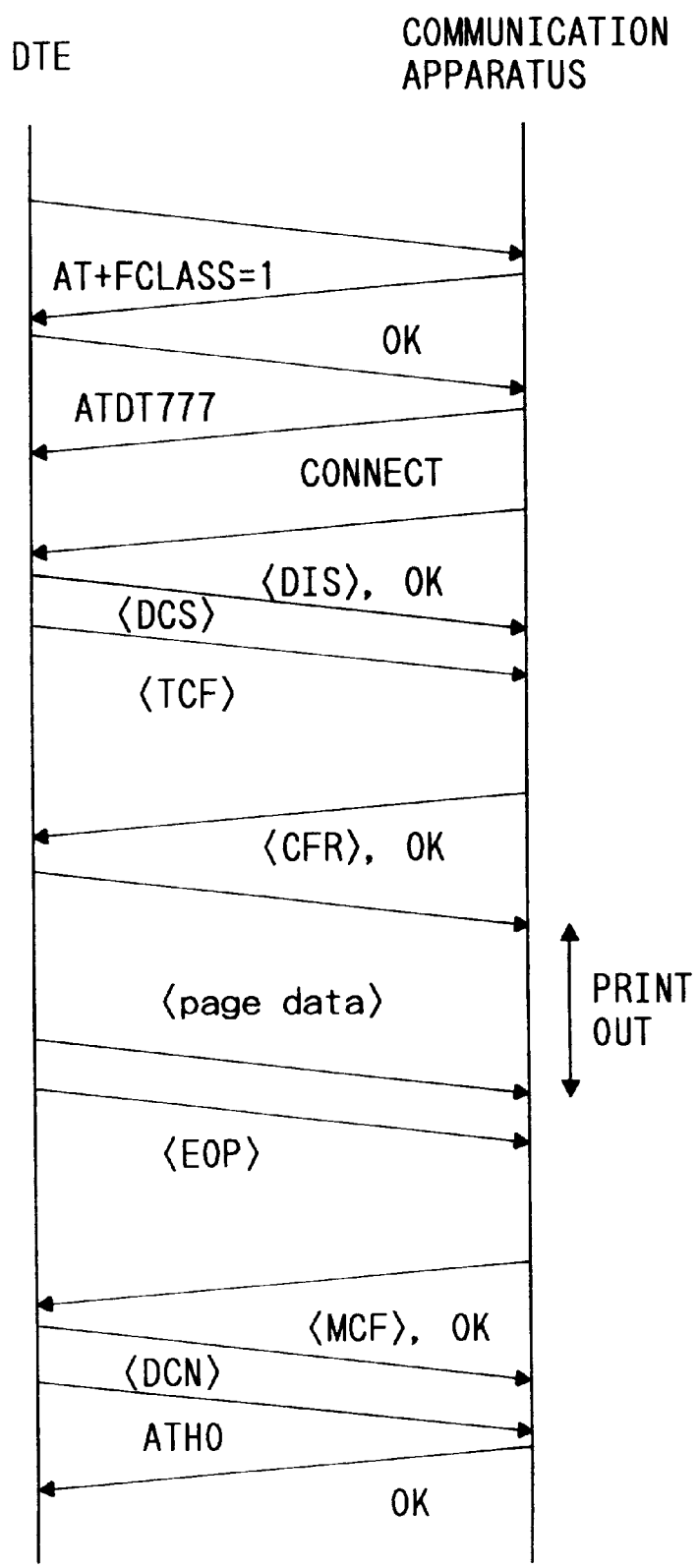
FIG. 4 is a timing chart showing operation of the present embodiment.

FIG. 3 illustrates that the DTE carries out facsimile communication through the apparatus of the present embodiment according to an AT command from the DTE (a communication command defined by HAYES Company as a command for driving, for example, the modem card or the like), and FIG. 4 illustrates that the DTE drives the apparatus of the present embodiment according to a similar AT command from the DTE. In other words, in the present embodiment, the apparatus of the present embodiment can be operated as, for example, a facsimile unit or a printer for a personal computer by using the AT commands which are deemed the standard in the communication field.

FIG. 3 differs from FIG. 4 in that, if a dial number from the DTE, which is a dial number following a calling command ATDT from the DTE, coincides with the preset dial number at the communication apparatus side, the apparatus of the present embodiment is operated as a printer. In FIG. 3, 2111 corresponds to this.

In FIG. 3, when the communication apparatus receives a command "AT+FCLASS=1", which designates an operation in class 1, from the DTE, the communication apparatus generates an OK answer. When the DTE receives this command, the DTE transmits a dial calling command "ATDT" and a following "dial number" to the communication apparatus, which dials a designated number for an appropriate line and returns an answer signal "CONNECT" to the DTE.

If the dial destination is a facsimile unit (partner FAX), the partner FAX answers to send back a "DIS signal".

When the communication apparatus receives the "DIS signal", the communication apparatus transmits the data corresponding to the received "DIS" and an "OK signal" indicating that "DIS" has been normally received to the DTE. The DTE transmits the data of "DCS" and "TCF" to the communication apparatus and the communication apparatus which has received the data transmits the "DCS signal" and the "TCF signal" to the partner FAX.

When the partner FAX receives a normal TCF signal, this facsimile unit answers the CFR signal to the communication apparatus and the communication apparatus transmits which has received the above answer signal transmits the "CFR data (hereafter referred to as <CFR>)" and "OK" as well as "DIS" to the DTE.

When the DTE receives "<CFR>" and "OK", the DTE transfers the page data  to be transmitted to the communication apparatus and the communication apparatus transmits the page data as the facsimile image information PIX to the partner FAX through the line.

When the DTE finishes the transfer of the page data  to be transmitted, the DTE transfers the data of EOP to the communication apparatus and the communication apparatus transmits the EOP data as the EOP signal to the partner FAX through the line.

When the partner FAX answers the "MCF signal" to the EOP, the communication apparatus transfers MCF data "<MCF>" and "OK" to the DTE.

When the DTE receives "<MCF>" and "OK", the DTE transfers "<DCN>" to the communication apparatus.

The communication apparatus which has received "<DCN>" transmits the "DCN signal" to the partner FAX and, when it receives an ATHO command from the DTE, the communication apparatus answers "OK" and opens the line.

With this series of operations, facsimile communication by the DTE through the communication apparatus is finished.

The following describes the operation according to FIG. 4. In FIG. 4, differing to FIG. 3, when a dial number ("777" in this embodiment) for transferring to the preset printer mode is transferred as the partner dial number from the DTE, the communication apparatus operates as a printer and returns an answer signal CONNECT to the DTE without calling the line.

Next the communication apparatus transfers the OK signal indicating that the DIS data and the DIS signal have been normally received to the DTE.

The communication apparatus which has received the normal "TCF signal" transmits "CFR data" <CFR> and "OK" to the DTE.

When the DTE receives "<CFR>" and "OK", the DTE transfers the page data to be transmitted to the communication apparatus, which prints out the page data while decoding it.

When the DTE finishes the transfer of the page data to be transmitted, the DTE transfers "EOP data" <EOP> to the communication apparatus and, when the communication apparatus receives "EOP data", it transfers "MCF data" <MCF> and "OK" to the DTE.

When the DTE receives "<MCF>" and "OK", the DTE transfers "<DCN>" and "ATHO command" to the communication apparatus and the communication apparatus which has received "ATHO command" answers "OK" and opens the line.

With this series of operations, the printing operation by the DTE through the communication apparatus is finished.

Figure 5:
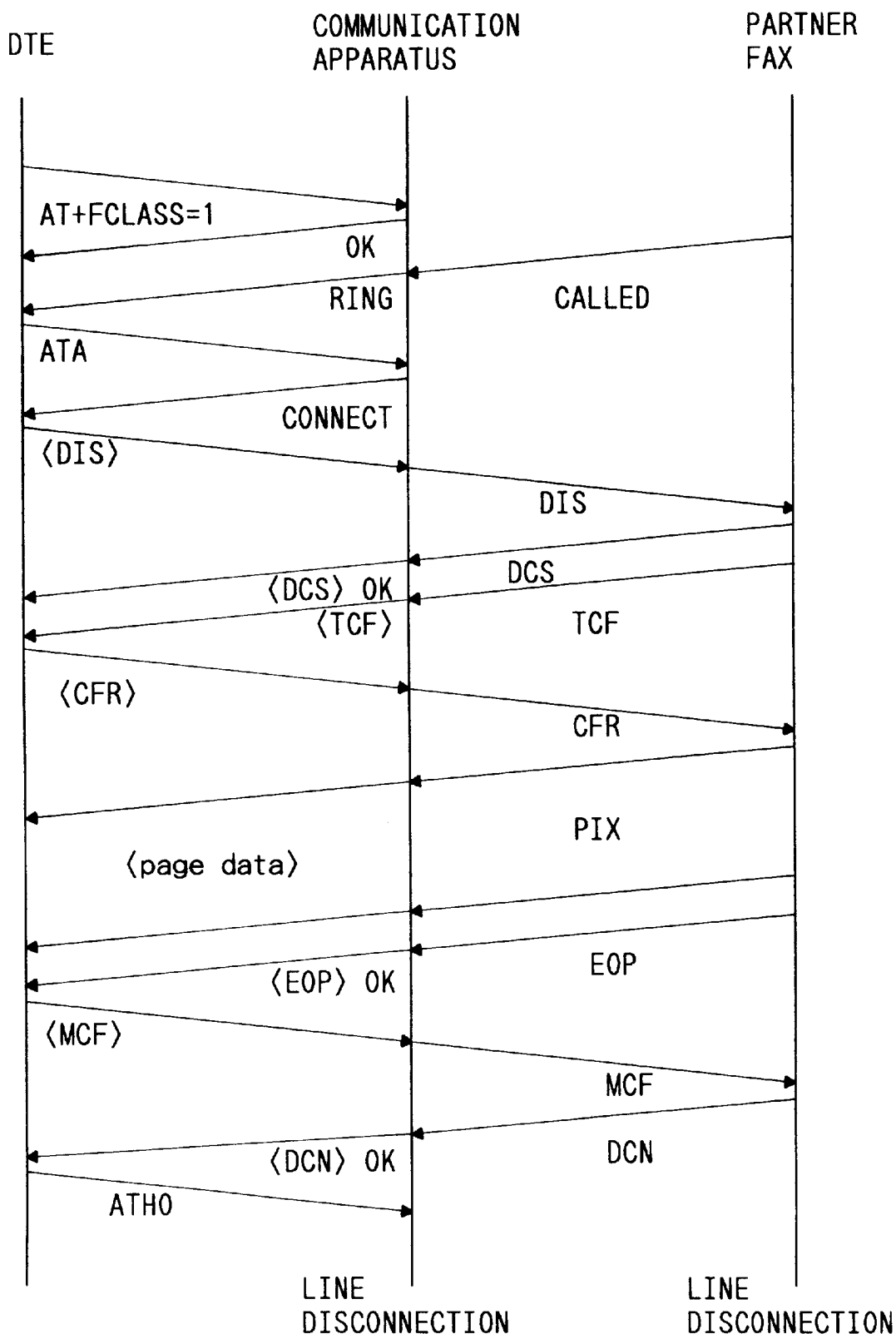
FIG. 5 is a timing chart showing operation of the present embodiment.
Figure 6:
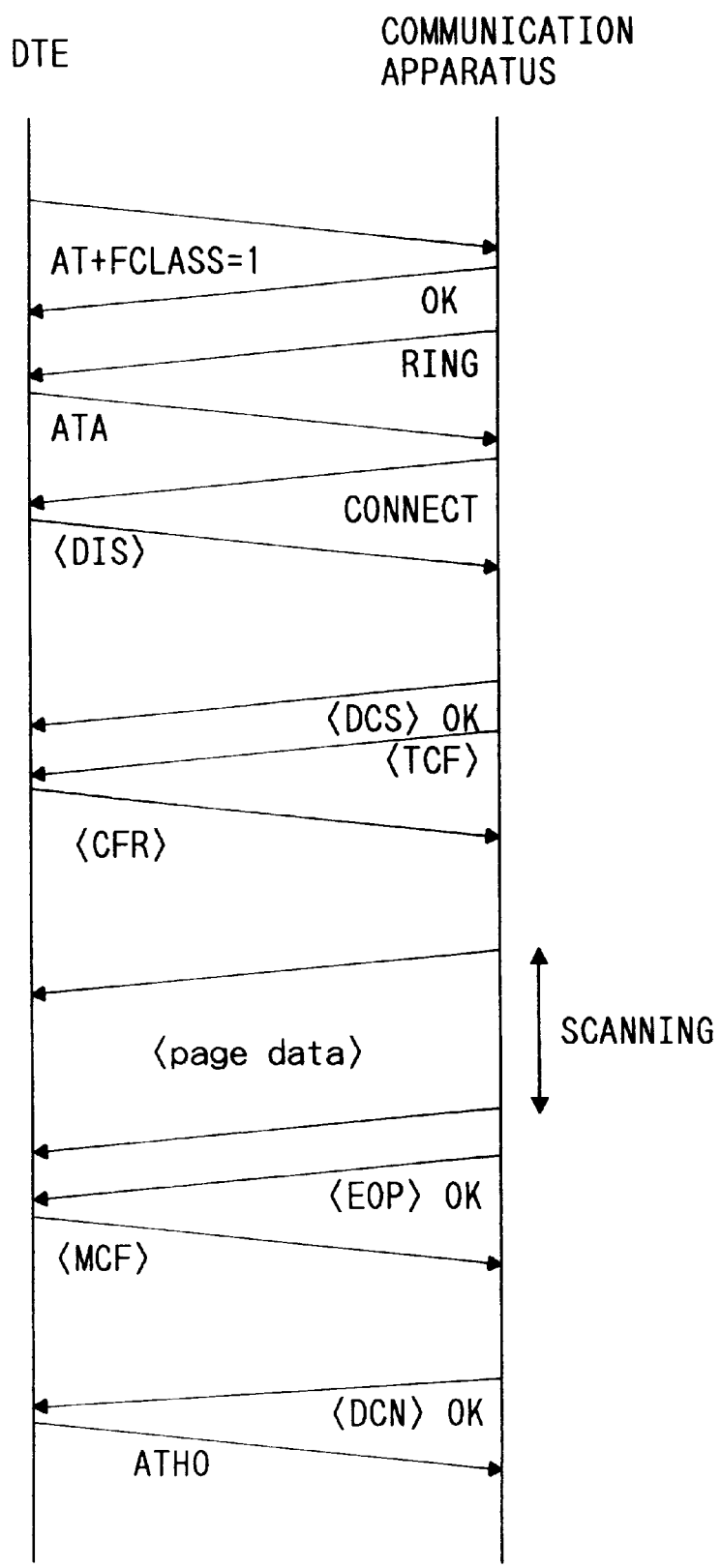
FIG. 6 is a timing chart showing operation of the present embodiment.

The following describes the operation according to FIGS. 5 and 6.

In FIG. 5, facsimile reception is carried out through the communication apparatus according to the AT command from the DTE and, in FIG. 6, the communication apparatus is operated as a scanner according to the AT command between the DTE and the communication apparatus.

Referring to FIG. 5, the communication apparatus returns the OK answer to the DTE when the communication apparatus receives the command "AT+FCLASS=1", which designates the operation in class 1 to be carried out, from the DTE. When the communication apparatus receives a signal from the partner FAX under this condition, the communication apparatus connects the line and transfers "RING signal" to the DTE. The DTE which has received "RING signal" transfers "ATA command" to the communication apparatus and the communication apparatus which has received "ATA command" answers "CONNECT signal" to the DTE.

When the DTE receives "CONNECT signal", it transfers DIS data to the communication apparatus and, when the communication apparatus receives the DIS data, it transmits "DIS signal" to the partner FAX.

When the partner FAX receives "DIS signal", it transmits "DCS signal" and "TCF" and, when the communication apparatus receives "DCS" and "TCF", it transmits the received "DCS data" <DCS>, the signal "OK" indicating that DCS has been normally received and "TCF data" <TCF> to the DTE.

If the DTE receives <DCS>, "OK" and <TCF> and determines that the received <TCF> is sufficient to receive the data, the DTE transfers CFR data to the communication apparatus and the communication apparatus transmits the received CFR data <CFR> as the CFR signal to the partner FAX (partner FAX) through the line.

The partner FAX which has received the CFR signal transmits the image data to be transmitted to the communication apparatus, which transfers the received image data PIX to the DTE.

When the partner FAX finishes transmission of image data, it transmits the EOP signal to the communication apparatus, which transfers "<EOP>, OK" to the DTE after receiving the above EOP signal.

When the DTE receives "<EOP>, OK", it transfers <MCF> to the communication apparatus, which transmits <MCF> as the MCF signal to the partner FAX through the line.

When the partner FAX receives the MCF signal, it transmits the DCN signal to the communication apparatus, which transfers the DCN signal as "<DCN>, OK" to the DTE.

When the DTE receives <DTE>, OK from the communication apparatus, the DTE transfers the ATHO command to the communication apparatus, which opens the line after having received the ATHO command, and finishes facsimile reception.

Referring to FIG. 6, the communication apparatus returns the OK answer to the DTE when the communication apparatus receives the command "AT+FCLASS=1", which designates the operation in class 1 to be carried out, from the DTE. When the scanner key F of the communication apparatus is pressed down under this condition, the communication apparatus transfers "RING signal" to the DTE and the DTE which has received "RING signal" transfers "ATA command" to the communication apparatus and the communication apparatus which has received "ATA command" answers "CONNECT signal" to the DTE.

When the DTE receives "CONNECT signal", it transfers DIS data <DIS> to the communication apparatus, and the communication apparatus which has received the DIS data transmits "DCS data" <DCS>, the signal "OK" indicating that DCS has been normally received and "TCF data" <TCF> to the DTE.

If the DTE receives <DCS>, "OK" and <TCF> and determines that the received <TCF> is sufficient to receive the data, the DTE transfers CFR data to the communication apparatus and the communication apparatus converts the image data read by the scanner to MH codes and transfers the data to the DTE.

When the communication apparatus finishes the scanner operation, it transfers "<EOP>, OK" to the DTE.

When the DTE receives "<EOP>, OK", it transfers <MCF> to the communication apparatus, which transmits "<DCN>, OK" to the DTE.

When the DTE receives <DTE>, OK from the communication apparatus, the DTE transfers the ATHO command to the communication apparatus, which finishes the scanner operation after having received the ATHO command.

The above is the outline of operation according to the present invention.

The operation of the communication apparatus according to the present invention is described in detail referring to the flow charts shown in FIGS. 7 to 10.

Figure 7:
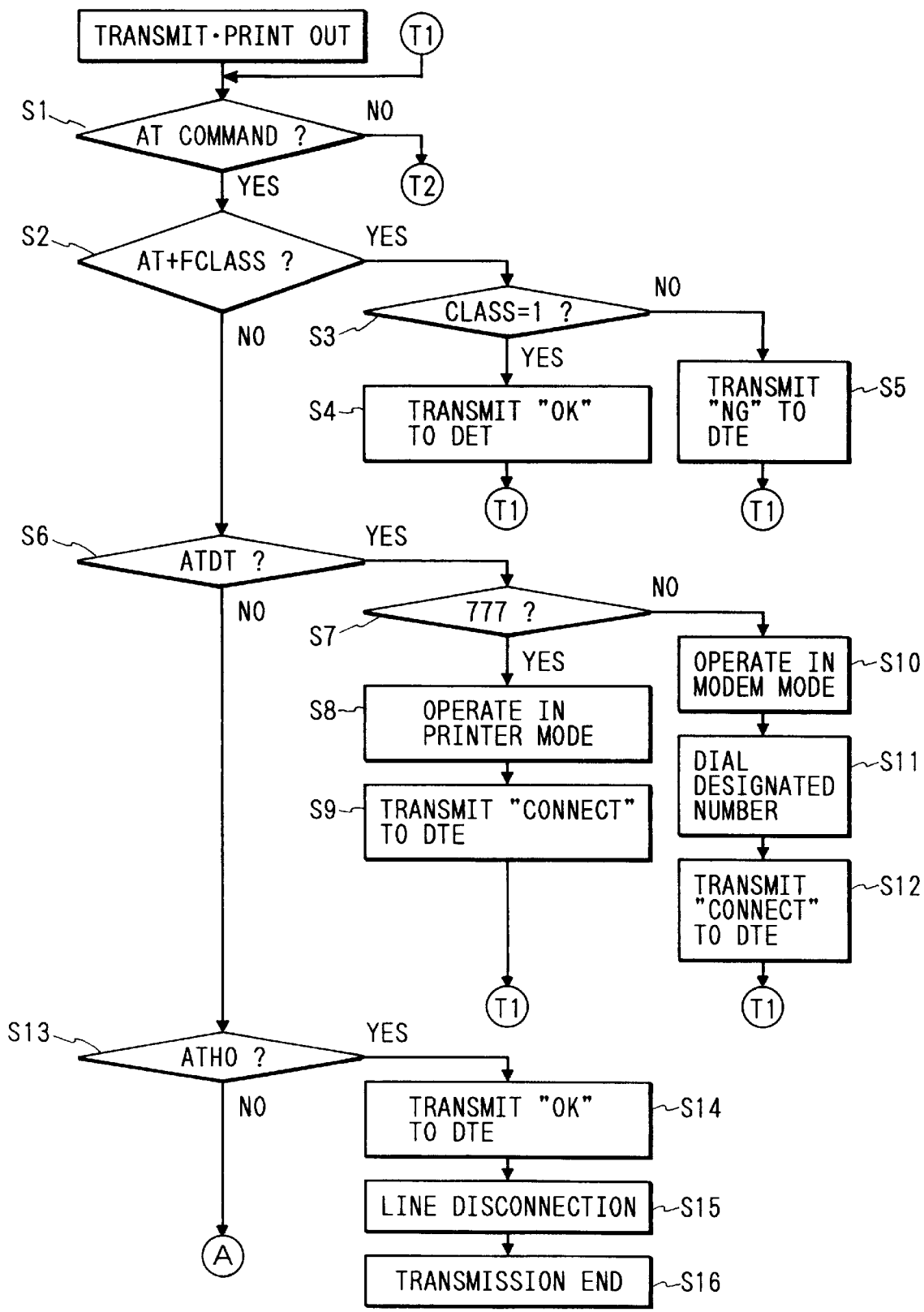
FIG. 7 is a flow chart showing communication, printout and scanning operations of a facsimile unit according to the present embodiment.
Figure 8:
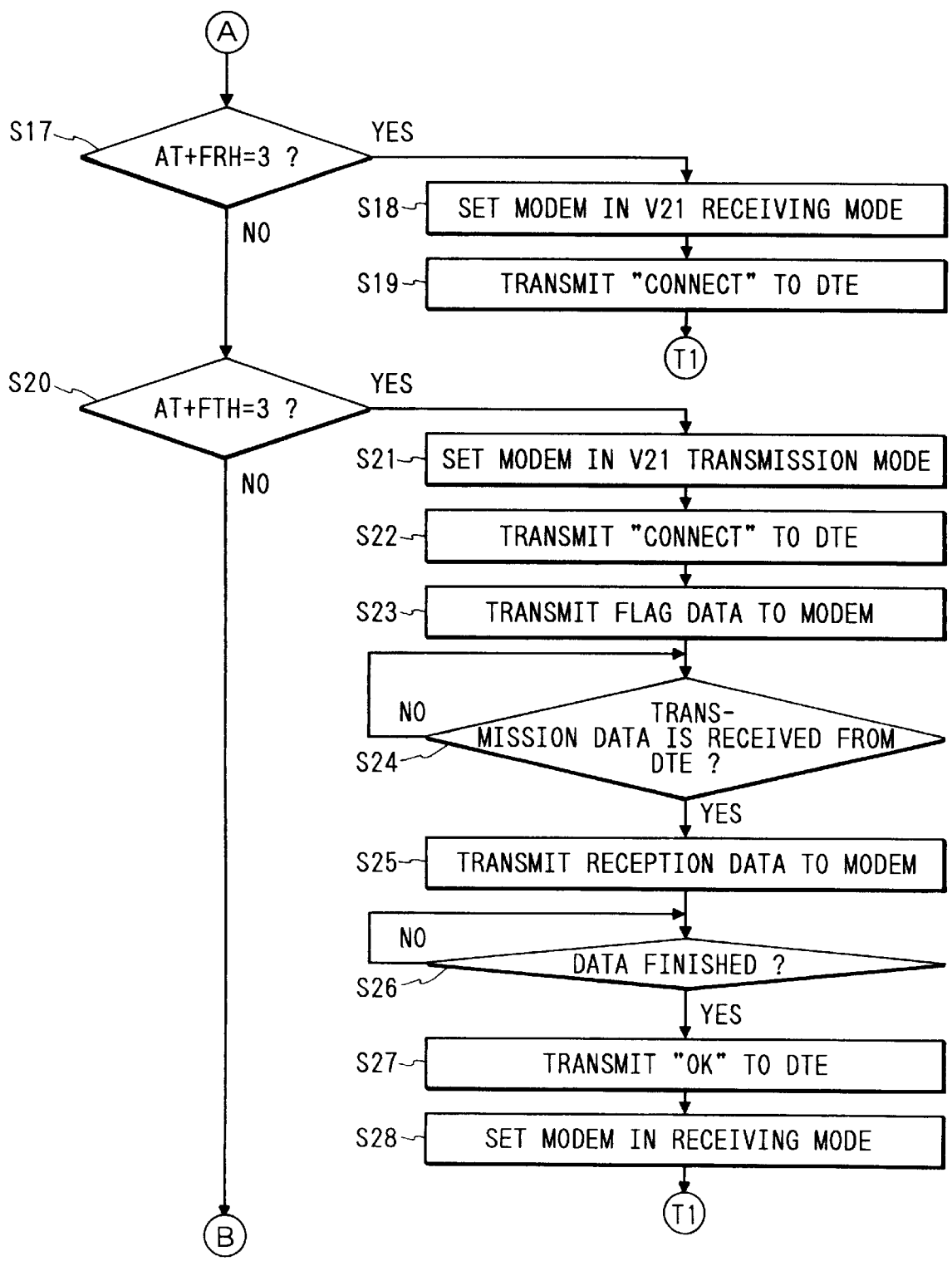
FIG. 8 is a flow chart showing communication, printout and scanning operations of a facsimile unit according to the present embodiment.
Figure 9:
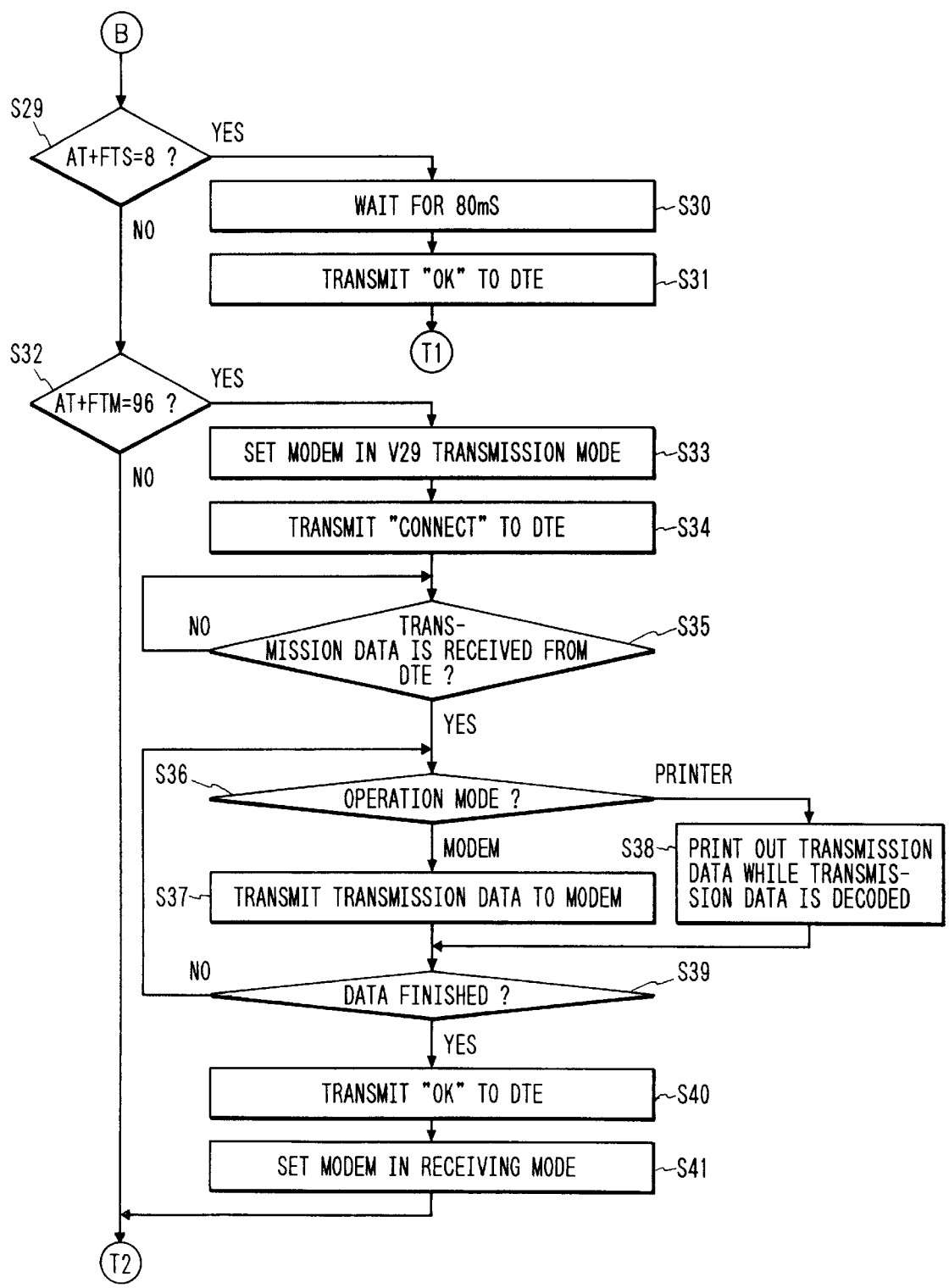
FIG. 9 is a flow chart showing communication, printout and scanning operations of a facsimile unit according to the present embodiment.

Referring to FIG. 7, there is shown a flow chart showing the operation of the communication apparatus in the mode of facsimile transmission and printer operation.

Figure 10:
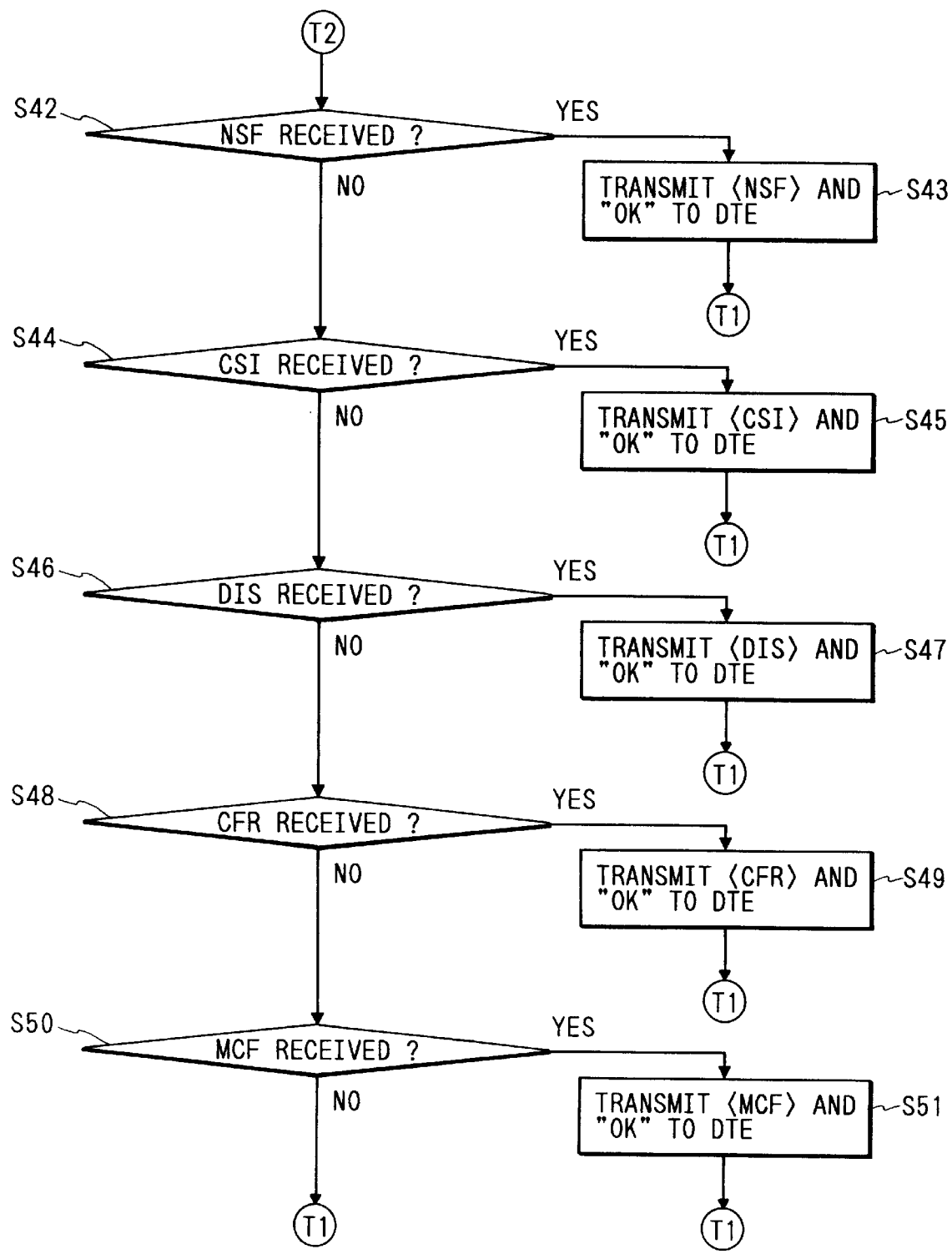
FIG. 10 is a flow chart showing communication, printout and scanning operations of a facsimile unit according to the present embodiment.

It is determined in step S1 whether or not the AT command has been received and, if not received, the operations of step S42 and following steps in FIG. 10 are carried out. When the AT command is received, an appropriate operation is carried out, depending on which AT command is received in step S2 and following steps.

If the AT command received in step S1 is the AT+CLASS command, the communication apparatus determines whether or not the AT command is of class 1. If it is of class 1, the communication apparatus transfers "OK" to the DTE and, if it is not of class 1, the communication apparatus transfers "NG" to the DTE in step S5 and returns to step S1. There are class 1 and class 2. Class 1 includes the commands to be outputted from a personal computer to the apparatus according to the present invention as in the embodiment described below and class 2 includes those composite commands functionally higher than the commands of class 1 to be outputted from the personal computer.

If a command which has been received in step S1 is ATDT, it is determined whether or not the number for the predetermined operation of the printer has been transferred after the ATDT command. If it is the predetermined number (for example, 777 in this case), the communication apparatus determines that it will operate as a printer in step S8, transfers "CONNECT" to the DTE in step S9 and returns to step S1.

If the number received in step S7 is not the predetermined number, the communication apparatus determines to operate as a modem in step S10, dials the number received after ATDT in step S11, transfers "CONNECT" to the DTE in step S12 after completion of dialing, and returns to step S1.

If a command received in S1 is "ATHO", the flow is branched from S13 to S14, "OK" is transferred to the DTE, the line is opened in S15, and transmission or printer operation is finished in S16.

If a command received in S1 is "AT+FRH=3", the flow is branched from S17 to S18, the modem is set to the reception mode of the V21 (300 bps) of the CCITT, and "CONNECT" is transferred to the DTE in S19.

If a command received in S1 is "AT+FTH=3", the modem is set to the transmission mode of the V21 of the CCITT in S21, "CONNECT" is transferred to the DTE in S22, a flag pattern is transferred to the modem in S23, and the communication apparatus waits to receive the data to be transmitted from the DTE.

When the data to be transmitted is received from the DTE in S24, the data received for the modem is transferred in S25, and data is transferred to the modem in S26 until data transfer is finished. If the data from the DTE is DCS data in this operation, the DCS signal is sent out to the line and, if it is EOP data, the EOP signal is sent out to the line.

When the final data is transferred to the modem in S26, "OK" is transferred to the DTE in S27 and the modem is set the reception mode in S28 and the operation returns to S1.

If a command received in S1 is "AT+FTS=8", the flow is branched from S29 to S30, waits for 80ms, "OK" is transferred to the DTE in S31 and the operation returns to S1.

If a command received in S1 is "AT+FTM=96", the flow is branched from S32 to S33, the modem is set to the transmission mode of the V29 (9600 bps) of the CCITT, "CONNECT" is transferred to the DTE in S34, and the communication apparatus waits for the transfer from the DTE of the data to be transmitted from the DTE.

When the data to be transferred from the DTE is received in S35, an operation mode is determined in S36 and, when the communication apparatus operates as a modem, transmission data is transferred to the modem and sent out to the line in S37.

If the communication apparatus operates as a printer in S36, the recording operation is carried out by the recording unit while transmission data of MH codes from the DTE are decoded in S38.

Operation in S37 and S38 is continued until transmission of data from the DTE is finished.

When transmission of data from the DTE is finished in S39, "OK" is transferred to the DTE in S40 and the modem is set to the reception mode in S41.

When a G3 facsimile procedure signal is transmitted from the partner FAX through the line, the operations of S24 and the following steps are carried out and, when an NSF signal is received, the received NSF data (<NSF>) and the OK signal indicating that the NSF signal has been normally received are transferred to the DTE in S43, and the operation returns to S1.

When CSI, DIS, CFR and MCF signals are received, the operation is the same as in NSF except that the data to be transferred to the DTE are <CSI>, <DIS>, <CFR> and <MCF>, respectively.

The following describes the operation referring to FIGS. 11 to 14. FIGS. 11 to 14 respectively show the flow chart showing the operation of the communication apparatus in the facsimile reception and scanner mode.

The communication apparatus waits until the "AT+CLASS" command is received in S101 and, when the "AT+CLASS" command is received, it is determined whether or not the command is of class 1 in S102. If the command is of class 1, "OK" is transferred to the DTE in S104 and the operation of S105 and following steps is carried out. If the command is not of class 1, "NG" is transferred to the DTE in S103 and the operation returns to S1.

When the scanner key F of the above-described operation unit 1-4 is pressed down in S105, it is decided to operate the communication apparatus as a scanner in S106 and, when a CI signal from the line is detected in S107, it is decided to operate the communication apparatus as a modem in S108, "RING" is transferred to the DTE in S109, and the operation advances to S110.

It is determined in S110 whether or not the AT command has been received from the DTE and, if it has not been received, the operation of S140 and following steps is carried out and, if the AT command has been received, an appropriate operation is carried out in S111 and following steps, depending on which AT command has been received.

If a command received in S110 is "ATHO", "OK" is transferred to the DTE in S112, the line is opened in S113, and reception or scanner operation is finished in S114.

Figure 12:
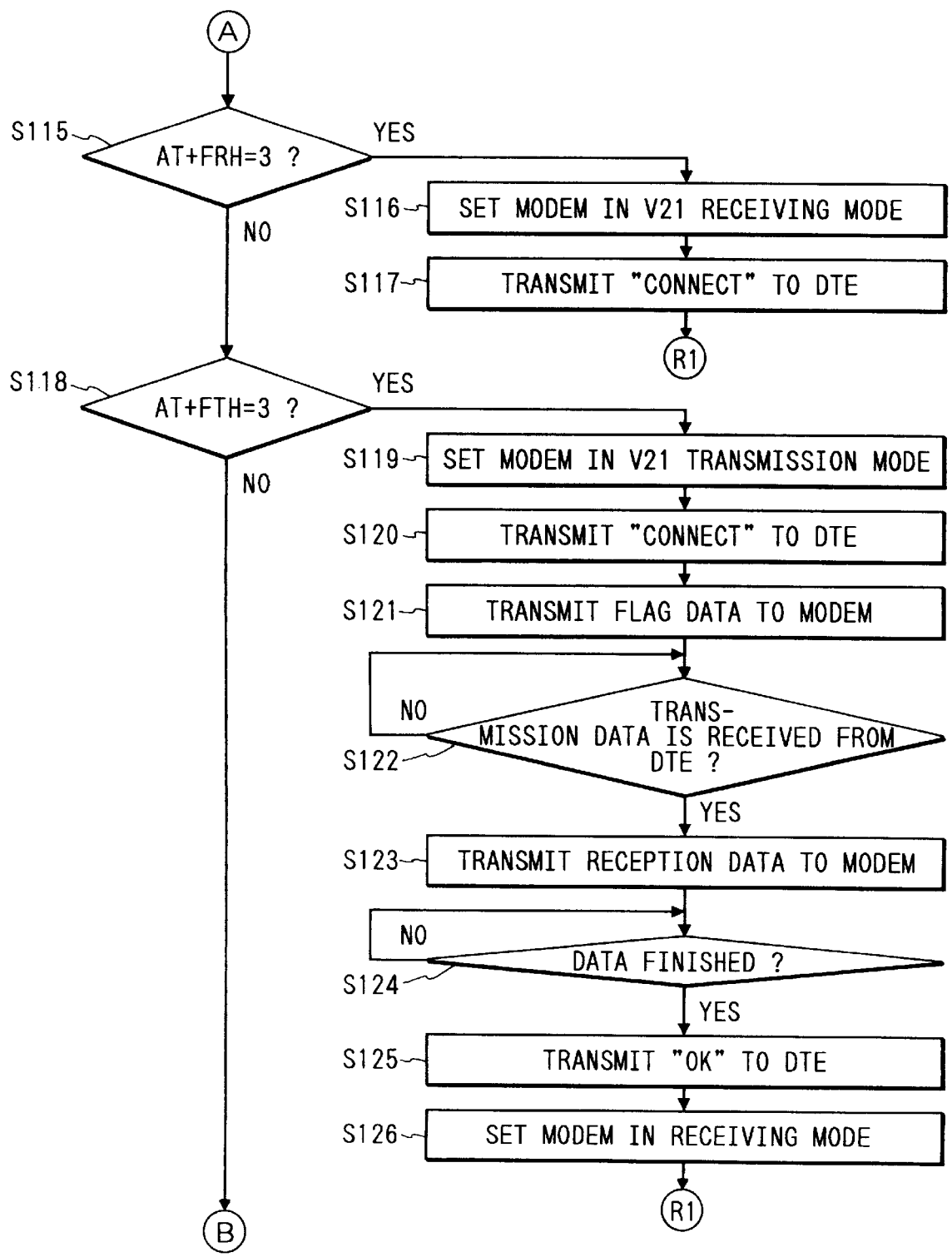
FIG. 12 is a flow chart showing communication, printout and scanning operations of a facsimile unit according to the present embodiment.

If a command received in S110 is "AT+FRH=3", the modem is set to the reception mode of the V21 (300 bps) of the CCITT in S116 of FIG. 12 and "CONNECT" is transferred to the DTE in S117.

If a command received in S110 is "AT+FTH=3", the modem is set to the transmission mode in S119, "CONNECT" is transferred to the DTE in S120, a flag pattern is transferred to the modem in S121, and the communication apparatus waits for the data to be transmitted from the DTE in S122.

When the data to be transmitted from the DTE is received in S122, the received data is transferred to the modem in S123 and the data is transferred to the modem in S124 until transmission of data is finished in S124. If the data from the DTE in this operation is DIS data, the DIS signal is sent out to the line and, if it is the data of CFR, the CFR signal is sent out to the line.

When the final data is transferred to the modem in S124, "OK" is transferred to the DTE in S125, the modem is set to the reception mode in S126, and the operation returns to S110.

Figure 11:
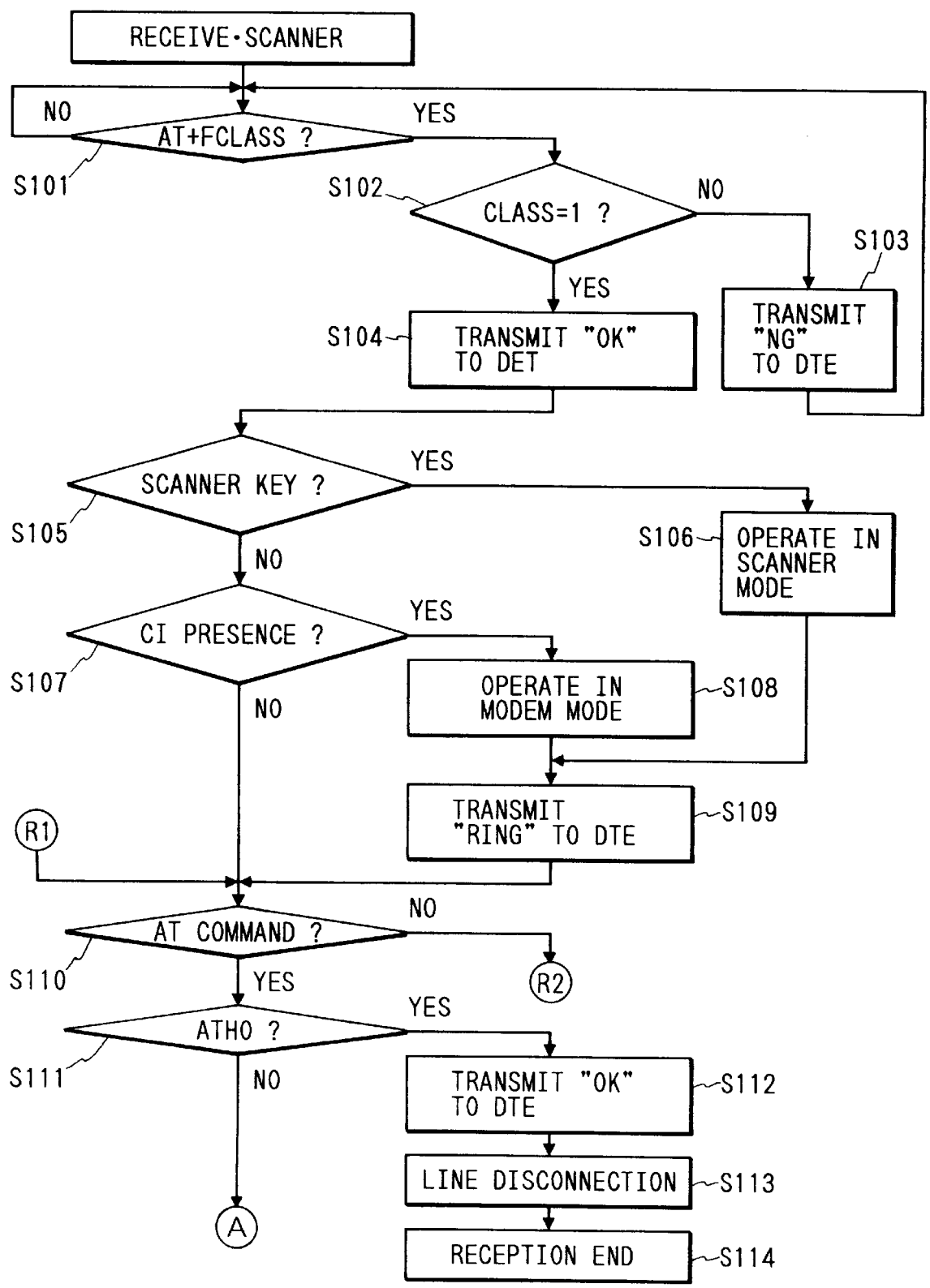
FIG. 11 is a flow chart showing communication, printout and scanning operations of a facsimile unit according to the present embodiment.
Figure 13:
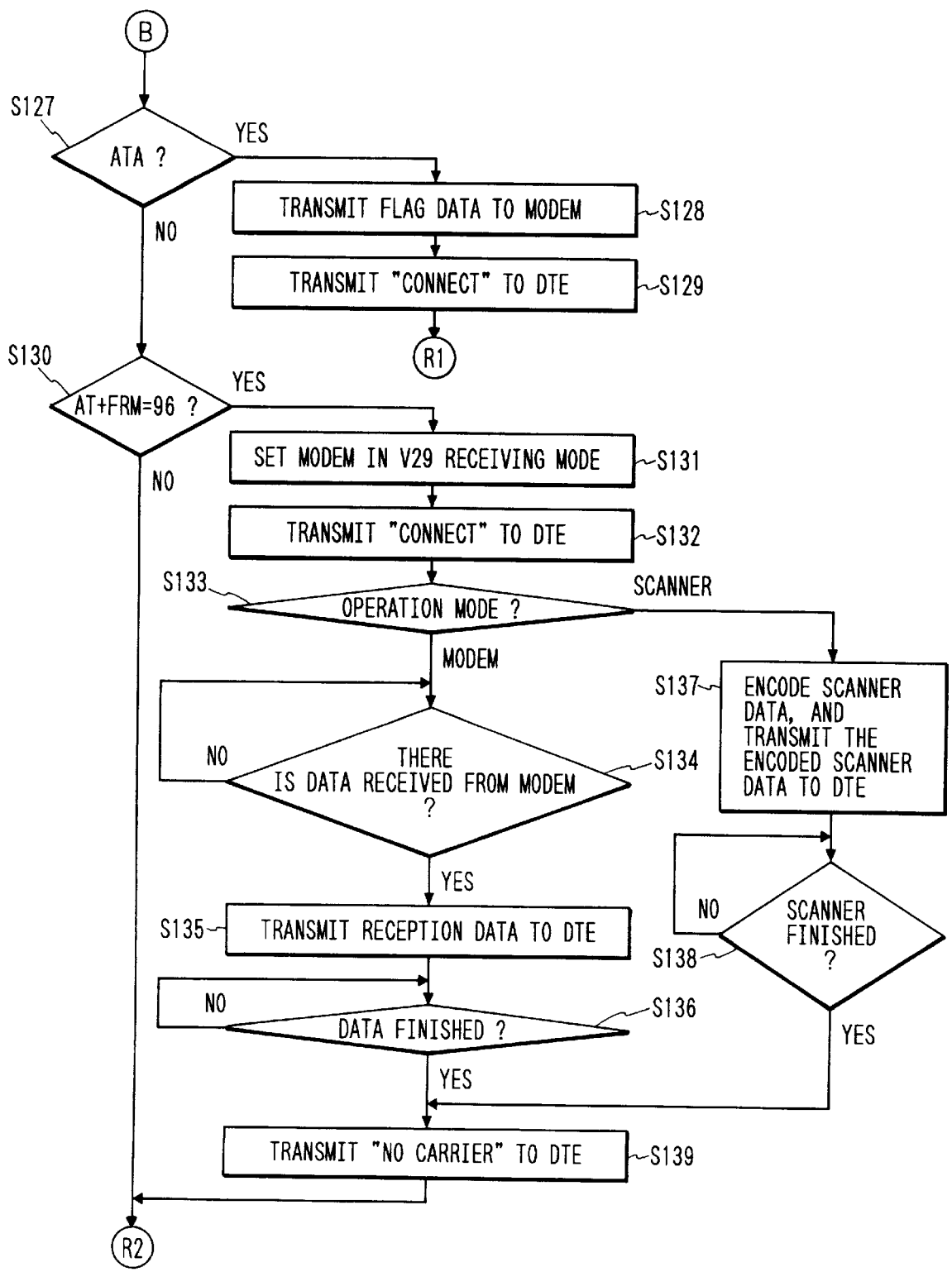
FIG. 13 is a flow chart showing communication, printout and scanning operations of a facsimile unit according to the present embodiment.
Figure 14:
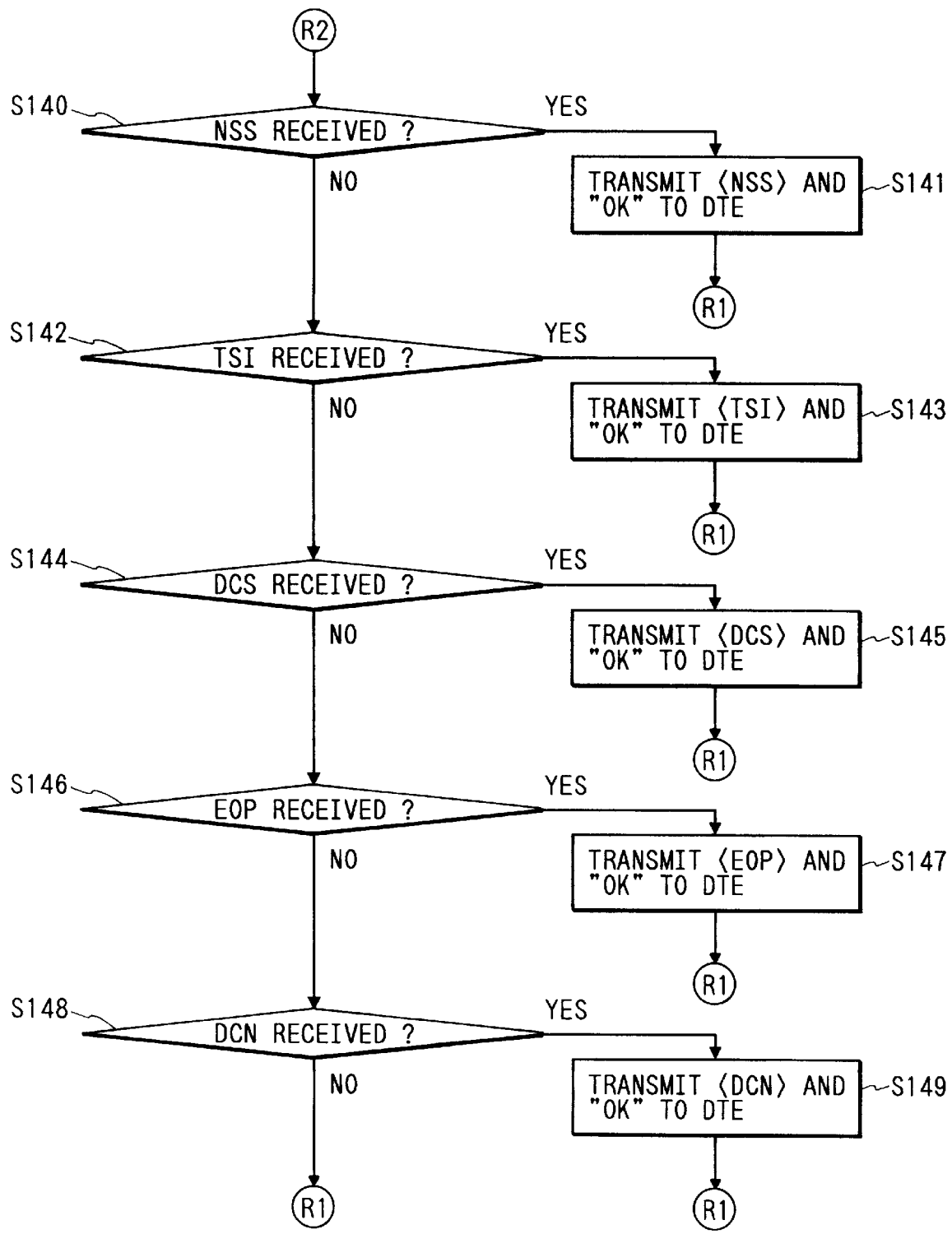
FIG. 14 is a flow chart showing communication, printout and scanning operations of a facsimile unit according to the present embodiment.

If it is determined in S127 that a command received in S110 of FIG. 11 is "ATA", the flag data is transferred to the modem in S128 of FIG. 13, "CONNECT" is transferred to the DTE in S129, and the operation returns to S110.

If it is determined in S130 that a command received in S110 of FIG. 11 is "AT+FRM=96", the modem is set to the reception mode of the V29 (9600 bps) of the CCITT in S131 of FIG. 13, "CONNECT" is transferred to the DTE in S132, and the operation mode is determined in S133. If the communication apparatus operates as a modem, the data received in S135 is transferred to the DTE when the modem demodulates the received data in S134, and the received data is transferred to the DTE until the RTC signal indicating the end of image data is received in S136.

When RTC is detected in S136, "NO CARRIER" is transferred to the DTE in S139.

In a case the communication apparatus is operated as a scanner in S133, the data read by the reading unit 1-5 is encoded to MH codes in S137, and simultaneously MH data is transferred to the DTE.

This operation in S138 is continued until reading of the original is finished in S139 and, when reading is finished, "NO CARRIER" is transferred to the DTE in S139.

When the G3 facsimile procedure signal is transmitted from the partner FAX through the line, the operation of S140 and following steps is carried out and, when an NSS signal is received, the received NSF data (<NSS>) and the "OK" signal indicating normal reception are transferred to the DTE in S141, and the operation returns to S110.

When TSI, DCS, EOP, and DCN signals are received, the operation is the same as in the case of NSS except that the data to be transferred to the DTE is <TSI>, <DCS>, <EOP> and <DCN>, respectively.

The above describes the operation of the flow charts of FIGS. 7 to 14.

As described above, the present embodiment enables communication, recording or reading to be determined at the communication apparatus side merely by conducting the same type of control at the personal computer side with the AT commands for data terminals and operating the communication apparatus as if it is carrying out communication as viewed from the personal computer, and therefore a scanner and a printer can be easily used with general-purpose communication software and a user of the personal computer need not purchase or prepare additional software.

Figure 15:
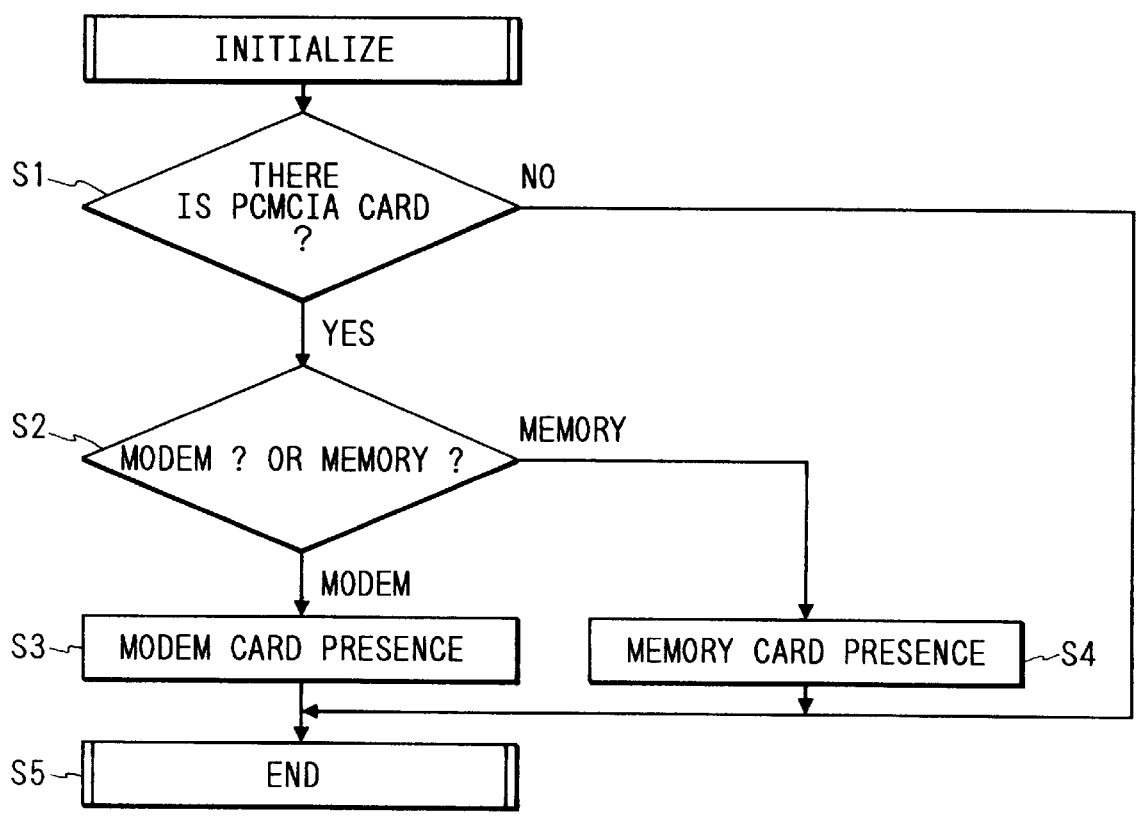
FIG. 15 is a flow chart showing an initializing operation.

The following describes the operation of the flow chart in FIG. 15. The operation of this flow chart is such that it is determined whether or not the PCMCIA card is loaded on the PCMCIA interface unit 1-18 in the initialize mode when the power supply is turned on or the operation of the apparatus is started (S1) and, if the card is loaded, it is determined whether the card connected to the interface unit 1-18 through the PCMCIA interface unit 1-18 is a modem card or a memory card by communicating with the card.

If the card is the modem card, the apparatus of the present embodiment modulates image data obtained from the reading unit 1-5 shown in FIG. 1 according to the modem card and transmits the image data as described above.

If the card is the memory card, the data read out from the memory card is transferred through the modem 1-8 and the NCU unit 1-9 and the data read out from the memory card is stored as visible images by the recording unit 1-6, and the communication apparatus operates in response to the loaded card according to the flow chart.

Figure 16:
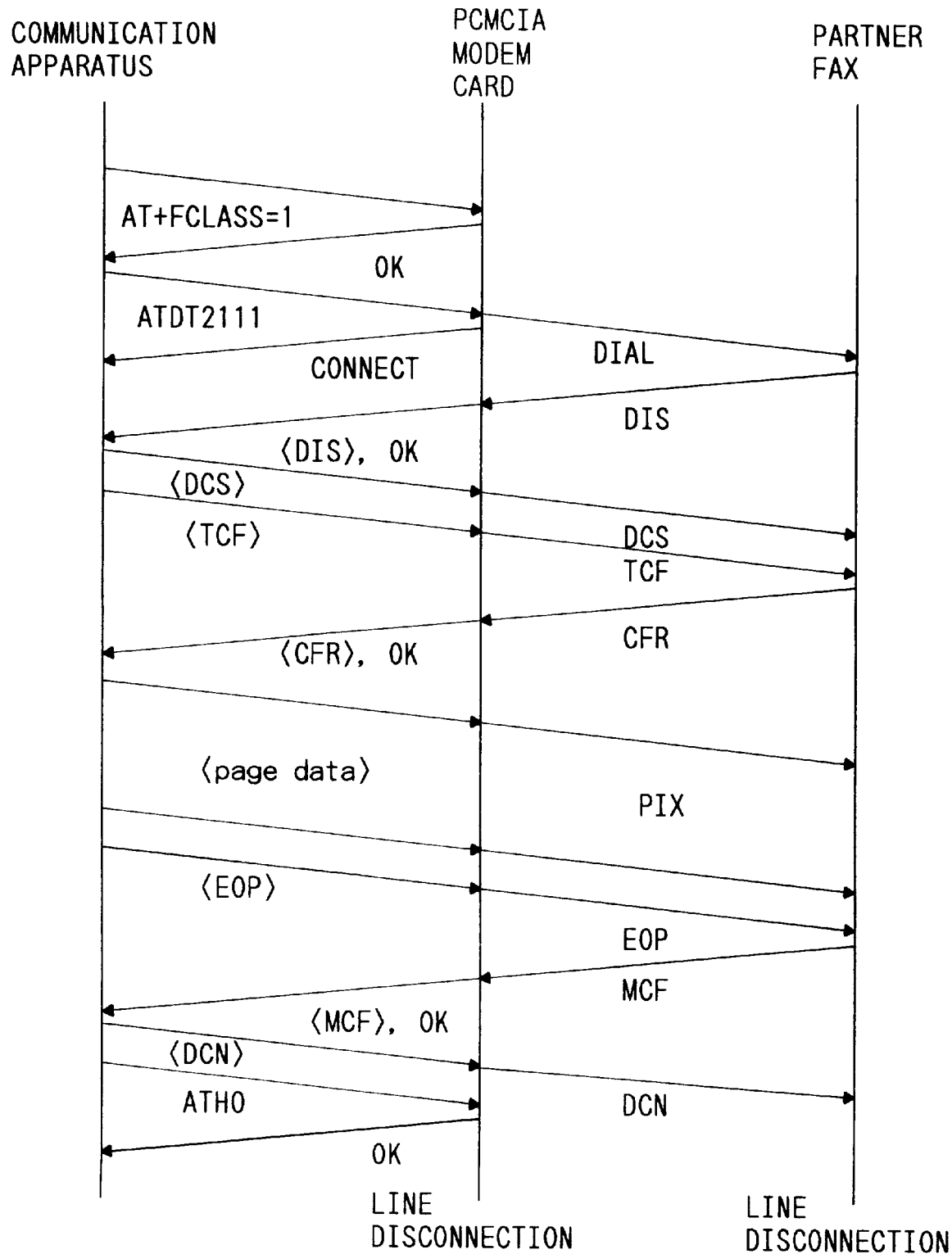
FIG. 16 is a timing chart showing an operation when a PCMCIA-FAX modem card is loaded on the communication apparatus.
Figure 17:
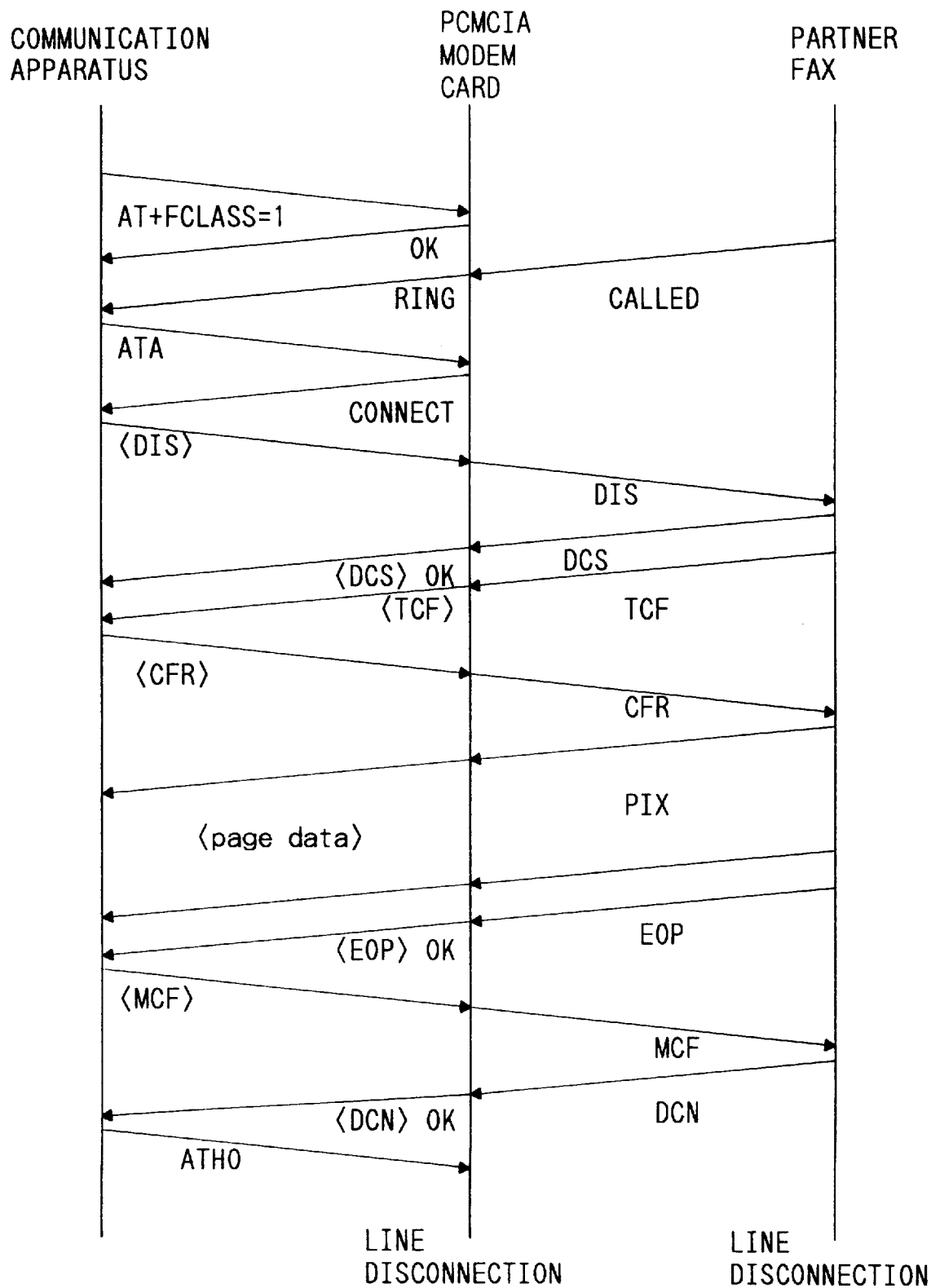
FIG. 17 is a timing chart showing an operation when a PCMCIA-FAX modem card is loaded on the communication apparatus.

FIGS. 16 and 17 respectively show an example of the above operation when the PCMCIA FAX modem card is loaded. FIG. 16 shows the case where the data is transmitted from the communication apparatus to the partner FAX through the PCMCIA modem card. FIG. 17 shows the case where the data is received from the partner FAX through the PCMCIA modem card.

In FIGS. 16 and 17, the communication apparatus is in place of the "DTE" shown in FIGS. 3 and 5, and the PCMCIA modem card is in place of the communication apparatus shown in FIGS. 3 and 5. The operation is almost similar to that in FIG. 3 and therefore the description of the operation is omitted.

The PCMCIA modem card to be used in the present embodiment may be higher in performance than the built-in modem 1-8 shown in FIG. 1, that is, for example, capable of simultaneously transmitting and receiving audio data and image data.

The following describes a case where a memory card to be used as a recording medium for a digital camera is used as the above-described memory card. Specifically, images picked up by the digital camera can be printed out or transmitted through the line by combining the digital camera using the PCMCIA memory card as the recording medium and the construction shown in FIG. 1 with the memory card as the present embodiment.

Figure 18:
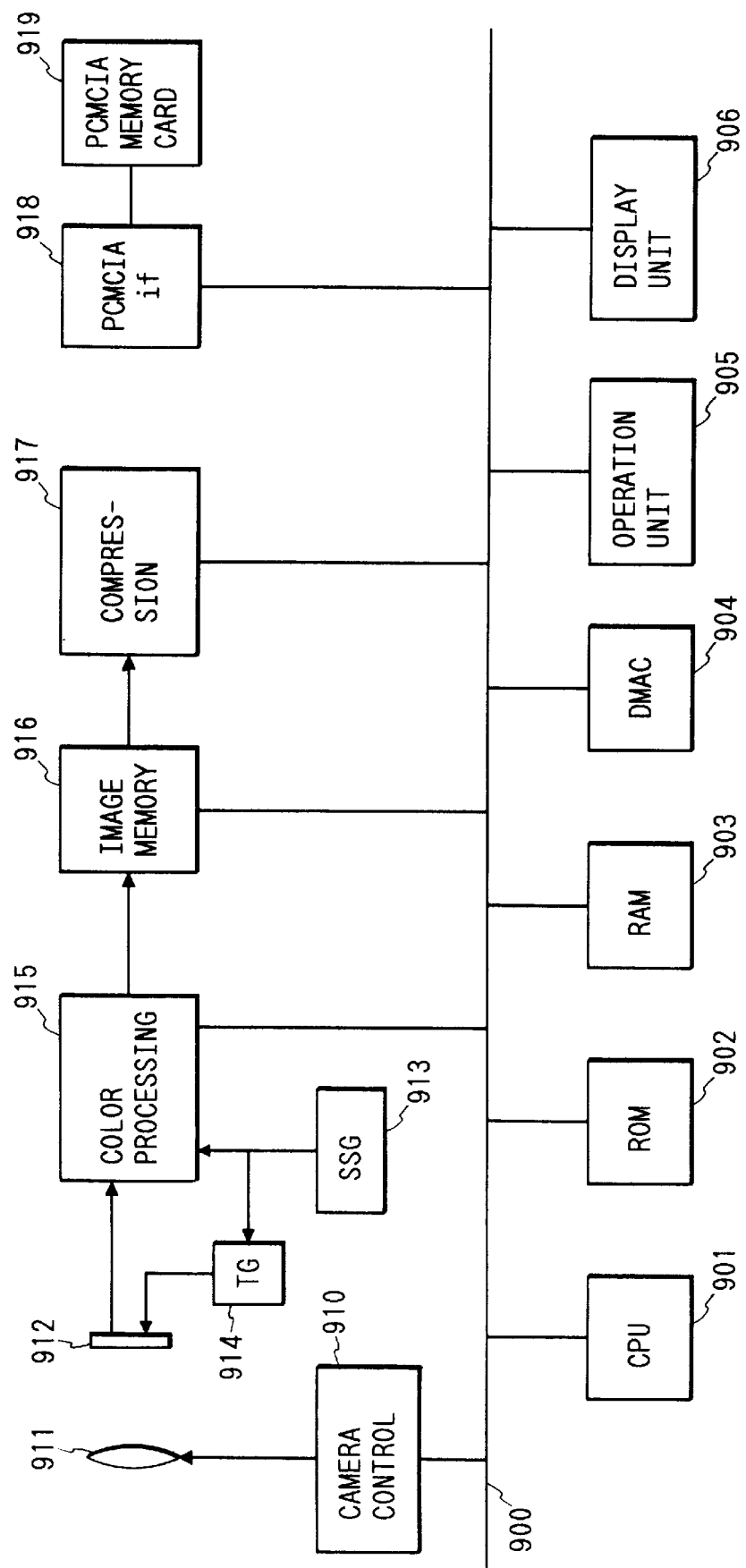
FIG. 18 is a block diagram showing a configuration of a digital camera according to the present embodiment.

FIG. 18 is a block diagram of the digital camera. In FIG. 18, reference numerals 900 denote a system bus, 901 is a CPU which controls the camera entirely, 902 is a ROM, 903 is a RAM, 904 is a direct memory access controller (DMAC), 905 is an operation unit, 906 is a display unit, 910 is a camera control unit, 911 is a lens, 912 is an image pickup device, 913 is a sync. signal generating unit (SSG), 914 is a timing signal generating unit (TG) which generates a pulse for driving the image pickup device 912 from a sync signal generated from the SSG 913, 915 is a color signal processing unit which processes an output signal of the image pickup device 912, 916 is an image memory which stores a signal converted by the color signal processing unit 915, 917 is a compression unit for compressing an image stored in the image memory 916, 918 is a PCMCIA interface, and 919 is a remountable PCMCIA memory card for storing image data compressed by the compression unit 917.

The CPU 901 which controls the camera entirely generates instructions to control the focus, zoom, iris and white balance through the camera control unit 910, the shutter is operated by a shutter operation of the operation unit 905, and an image for one frame is stored in the image pickup device 912. The signal stored in the image pickup device 912 is read according to a timing of a sync signal generated by the SSG 913 and sent to the color processing unit 915. In the color processing unit 915, the image signal arrayed according to the color filter array attached to the image pickup device 912 is converted into a brightness signal and a color difference signal. The brightness signal and two color difference signals converted by the color processing unit 915 are stored in the image memory 916. An image stored once in the image memory 916 is compressed with respect to JPEG or the like by the compression unit 917, a data volume is compressed, and the data is stored in the PCMCIA memory card through the system bus 900 and the PCMCIA interface 918. Thus, the image pickup operation can be repeated by repeating the above until the PCMCIA memory card 918 which is a recording medium is filled up.

Next, to transmit or store an image picked up by the digital camera and stored in the PCMCIA memory card 919, the PCMCIA memory card 919 is inserted into the PCMCIA interface 1-18 shown in FIG. 1. The communication apparatus is able to print the image picked up and stored in the memory card 919 and transmit the image data through the line according to the commands from the operation unit 1-4. On the other hand, image data read by the reading unit 1-5 can be stored in the PCMCIA memory card which is the recording medium. The following describes the printing and transmitting operations carried out by the communication apparatus. To reproduce the color image data which is, for example, JPEG-compressed and stored in the card, the image data which is JPEG-compressed is expanded in the image processing unit 1-15 in the communication apparatus. If the communication apparatus at the partner FAX side is applicable to color image data, color conversion to RGB data is carried out. In a case where the communication apparatus is set to a monochrome mode, only the brightness signal component is printed or transmitted by the recording unit 1-6. For transmission to an ordinary monochrome facsimile unit, the image data is encoded and transmitted after having been binary-coded by the binary coding processing functions such as dither and error dispersion of the image processing unit 1-15 in the communication apparatus. In addition, only one image to be selected can be printed and facsimile-transmitted according to the commands of the operation unit 1-4, or all images or the compressed index images of all images can be printed and facsimile-transmitted according to a software.

In the above embodiment, the reading unit 1-5 can be a color reading unit which has the line sensor for R, G and B colors and the recording unit 1-6 can be a recording unit for which a color print head and a monochrome print head are selectively remountable.

In this case, a color image signal obtained from the color reading unit can be outputted to the external personal computer 1-25 shown in FIG. 1 through the DTE interface 1-17, color image processing such as, for example, color balance adjustment or gamma adjustment for respective colors, binary coding or color data compression can be carried out according to the software of the personal computer, the processed color data can be outputted to the modem 1-8 through the DTE interface 1-17, and the data modulated by the modem 1-8 can be transmitted through the NCU unit.

In the apparatus according to the present invention, however, a command for carrying out the above-described color image processing is outputted to the personal computer before outputting the color image signal through the DTE. For compressing the color image data, a parameter for such compression is outputted to the personal computer.

For processing the compressed color image data received from the mating facsimile unit through the NCU unit, the color data can be outputted to the external personal computer 1-25 through the DTE interface 1-17, color data expansion processing or gamma adjustment for respective colors can be carried out according to the software of the personal computer 1-25, and the processed data can be outputted to the recording unit 1-6 through the DTE interface 1-17 and recorded by the color print head installed on the recording unit 1-6.

In the apparatus according to the present invention, therefore, a parameter for expansion of color data is outputted to the personal computer before the compressed color image data is outputted through the DTE interface.

Such control as described above is carried out where it is determined that the color image data is transmitted from the partner facsimile unit according to the protocol in conjunction with the mating facsimile unit. When it is determined according to the above protocol that monochrome image data is transmitted from the partner facsimile unit, normal monochrome image processing is carried out by the processing unit 1-15 and a monochromic image is recorded.

As described above, the color print head is installed on the recording unit 1-6, the reading unit 1-5 is made a color reading unit, and a color image processing function is executed by using the external personal computer, thereby enabling to provide color image data transmission and reception functions.

The apparatus according to the present invention can be provided with the color image data transmission and reception functions by connecting a color reading unit or a color recording unit to the personal computer connected through the DTE interface 1-17.

The present embodiment provides a communication apparatus which excels in versatility.

In addition, the present embodiment provides a multi-function communication apparatus by loading various cards.

A color recording function can be added as an option by carrying out color image processing in the external processing unit, for example, an external computer.

What is claimed is:

1. An image processing apparatus having an interface connected to a data terminal, said image processing apparatus comprising:

recording means for recording data received from the data terminal;

transmitting means for transmitting the data;

discriminating means for discriminating whether or not a command including a dial number received from the data terminal includes a predetermined number; and control means for controlling said recording means and said transmitting means on the basis of a discrimination result by said discriminating means, wherein said control means controls said recording means to record the data when said discriminating means discriminates that the received command includes the predetermined number and controls said transmitting means to transmit the data to a destination corresponding to the received dial number when said discriminating means discriminates that the received command does not include the predetermined number.

2. An apparatus according to claim 1, wherein the received command includes the dial number sequential to a calling command.

3. An apparatus according to claim 2, wherein the calling command is "ATDT", which is an AT command of Hayes.

4. An apparatus according to claim 1, wherein the data terminal is a personal computer.

5. A method of operating an image processing apparatus having an interface connected to a data terminal, said method comprising the steps of:

recording data received from the data terminal;

transmitting the data;

discriminating whether or not a command including a dial number received from the data terminal includes a predetermined number; and controlling said recording step and said transmitting step on the basis of a discrimination result by said transmitting step, wherein said control step controls said recording step to record the data when said discriminating step discriminates that the received command includes the predetermined number and controls said transmitting step to transmit the data to a destination corresponding to the received dial number when said discriminating step discriminates that the received command does not include the predetermined number.

6. A method according to claim 5, wherein the received command includes the dial number sequential to a calling command.

7. A method according to claim 6, wherein the calling command is "ATDT", which is an AT command of Hayes.

8. A method according to claim 5, wherein the data terminal is a personal computer.

9. An image processing apparatus having an interface connected to a data terminal, said image processing apparatus comprising:

transmitting means for transmitting data received from the data terminal;

discriminating means for discriminating whether or not a command including a dial number received from the data terminal includes a predetermined number; and control means for controlling at least said transmitting means on the basis of a discrimination result by said discriminating means, wherein said control means controls said transmitting means to transmit the data to a destination corresponding to the received dial number when said discriminating means discriminates that the received command does not include the predetermined number, and controls said transmitting means not to transmit the data and further controls said apparatus to perform a different process when said discriminating means discriminates that the received command includes the predetermined number.

10. An image processing method in an image processing apparatus having an interface connected to a data terminal, said method comprising the steps of:

transmitting data received from the data terminal;

discriminating whether or not a command including a dial number received from the data terminal includes a predetermined number; and controlling at least said transmitting step on the basis of a discrimination result at said discriminating step, wherein said control step controls said transmitting step to transmit the data to a destination corresponding to the received dial number when said discriminating step discriminates that the received command does not include the predetermined number, and controls said transmitting step not to transmit the data and further controls the apparatus to perform a different process when said discriminating step discriminates that the received command includes the predetermined number.

11. An image processing apparatus having an interface connected to a data terminal having at least a program for controlling a modem, said image processing apparatus comprising:

recording means for recording data received from the data terminal;

transmitting means for transmitting the data according to a command based on the program for controlling the modem;

discriminating means for discriminating whether or not a command for controlling the modem and received from the data terminal corresponds to a predetermined command; and control means for controlling said recording means and said transmitting means on the basis of a discrimination result by said discriminating means, wherein said control means controls said recording means to record the data when said discriminating means discriminates that the received command corresponds to the predetermined command and controls said transmitting means to transmit the data to a destination corresponding to the received command when said discriminating means discriminates that the received command does not correspond to the predetermined command.

12. An apparatus according to claim 11, wherein the received command is a dial number sequential to a calling command.

13. An apparatus according to claim 12, wherein the calling command is an AT command of Hayes.

14. An apparatus according to claim 13, wherein the calling command is "ATDT", which is an AT command of Hayes.

15. An apparatus according to claim 11, wherein the data terminal is a personal computer.

16. A method of operating an image processing apparatus having an interface connected to a data terminal having at least a program for controlling a modem, said method comprising the steps of:

recording data received from the data terminal;

transmitting the data according to a command based on the program for controlling the modem;

discriminating whether or not a command for controlling the modem and received from the data terminal corresponds to a predetermined command; and controlling said recording step and said transmitting step on the basis of a discrimination result by said transmitting step, wherein said control step controls said recording step to record the data when said discriminating step discriminates that the received command corresponds to the predetermined command and controls said transmitting step to transmit the data to a destination corresponding to the received command when said discriminating step discriminates that the received command does not correspond to the predetermined command.

17. A method according to claim 16, wherein the received command is a dial number sequential to a calling command.

18. A method according to claim 17, wherein the calling command is an AT command of Hayes.

19. A method according to claim 18, wherein the calling command is "ATDT", which is an AT command of Hayes.

20. A method according to claim 16, wherein the data terminal is a personal computer.

21. An image processing apparatus having an interface connected to a data terminal having at least a program for controlling a modem, said image processing apparatus comprising:

transmitting means for transmitting data received from the data terminal according to a command based on the program for controlling the modem;

discriminating means for discriminating whether or not a command for controlling the modem and received from the data terminal corresponds to a predetermined command; and control means for controlling at least said transmitting means on the basis of a discrimination result by said discriminating means, wherein said control means controls said transmitting means to transmit the data to a destination corresponding to the received command when said discriminating means discriminates that the received command does not correspond to the predetermined command and controls said transmitting means not to transmit the data and further controls said apparatus to perform a different process when said discriminating means discriminates that the received command corresponds to the predetermined command.

22. An image processing method in an image processing apparatus having an interface connected to a data terminal having at least a program for controlling a modem, said method comprising the steps of:

transmitting data received from the data terminal according to a command based on the program for controlling the modem;

discriminating whether or not a command for controlling the modem and received from the data terminal corresponds to a predetermined command; and controlling at least said transmitting step on the basis of a discrimination result at said discriminating step, wherein said control step controls said transmitting step to transmit the data to a destination corresponding to the received command when said discriminating step discriminates that the received command does not correspond to the predetermined command and controls said transmitting step not to transmit the data and further controls the apparatus to perform a different process when said discriminating step discriminates that the received command corresponds to the predetermined command.

* * * * *